(12) United States Patent
Takemoto

(10) Patent No.: US 11,283,377 B2
(45) Date of Patent: Mar. 22, 2022

(54) IDENTIFICATION METHOD AND IDENTIFICATION DEVICE FOR IDENTIFYING TYPE OF BRUSHLESS DC MOTOR, AND BRUSHLESS DC MOTOR

(71) Applicant: Nidec Corporation, Kyoto (JP)

(72) Inventor: Hideyuki Takemoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 127 days.

(21) Appl. No.: 16/762,530

(22) PCT Filed: Nov. 6, 2018

(86) PCT No.: PCT/JP2018/041110
§ 371 (c)(1),
(2) Date: May 8, 2020

(87) PCT Pub. No.: WO2019/093300
PCT Pub. Date: May 16, 2019

(65) Prior Publication Data
US 2020/0350839 A1    Nov. 5, 2020

(30) Foreign Application Priority Data
Nov. 9, 2017 (JP) ............................. JP2017-216420

(51) Int. Cl.
*H02P 27/00* (2006.01)
*H02P 6/12* (2006.01)
*H02P 6/28* (2016.01)

(52) U.S. Cl.
CPC . *H02P 6/12* (2013.01); *H02P 6/28* (2016.02)

(58) Field of Classification Search
CPC .................................... H02P 6/12; H02P 6/28
USPC ...................................................... 318/400.3
See application file for complete search history.

(56) References Cited

U.S. PATENT DOCUMENTS

| | | | |
|---|---|---|---|
| 2006/0152891 A1 | 7/2006 | Jreij et al. | |
| 2012/0038301 A1* | 2/2012 | Iwasaki | H02K 37/14 318/400.23 |
| 2012/0306421 A1* | 12/2012 | Kessler | H02P 29/50 318/460 |
| 2018/0316288 A1* | 11/2018 | Takemoto | H02P 6/12 |
| 2018/0317340 A1* | 11/2018 | Takemoto | H05K 7/20209 |

* cited by examiner

*Primary Examiner* — Erick D Glass
(74) *Attorney, Agent, or Firm* — Keating & Bennett

(57) ABSTRACT

An identification method includes supplying a motor power supply voltage from an identification device to a brushless DC motor via a power line, receiving the supply of the power supply voltage to rotate the brushless DC motor in accordance with a Pulse Width Modulation (PWM) signal output from a drive circuit of the brushless DC motor, superimposing an identification signal with a same frequency as that of the PWM signal on a power supply current flowing through the power line upon rotation of the brushless DC motor, acquiring the power supply current flowing through the power line, detecting the frequency of the identification signal superimposed on the power supply current, and identifying information about the brushless DC motor based on the detected frequency of the identification signal.

19 Claims, 14 Drawing Sheets

| TYPE OF BRUSHLESS DC MOTOR | UNIQUE INFORMATION |
|---|---|
| 3'b001 // SUPPLIER A | 20kHz±2kHz (20V) |
| 3'b010 // SUPPLIER B | 25kHz±2kHz (25V) |
| 3'b011 // SUPPLIER C | 30kHz±2kHz (30V) |

Fig. 7

| TYPE OF BRUSHLESS DC MOTOR | UNIQUE INFORMATION |
|---|---|
| 3'b001 // SUPPLIER A | 8'h41 "A" |
| 3'b010 // SUPPLIER B | 8'h42 "B" |
| 3'b011 // SUPPLIER C | 8'h43 "C" |

Fig. 9

IDENTIFICATION METHOD AND IDENTIFICATION DEVICE FOR IDENTIFYING TYPE OF BRUSHLESS DC MOTOR, AND BRUSHLESS DC MOTOR

CROSS REFERENCE TO RELATED APPLICATIONS

This is a U.S. national stage of PCT Application No. PCT/JP2018/041110, filed on Nov. 6, 2018, and priority under 35 U.S.C. § 119(a) and 35 U.S.C. § 365(b) is claimed from Japanese Application No. 2017-216420, filed Nov. 9, 2017; the entire disclosures of each of which are hereby incorporated herein by reference.

1. FIELD OF THE INVENTION

The present disclosure relates to an identification method and an identification device for identifying a type of a brushless DC motor, and a brushless DC motor.

2. BACKGROUND

Many electronic devices include, for example, a fan motor as a cooling device for releasing heat generated inside to the outside. In an electronic device, a fan motor is electrically connected to a system controller and operates under the control of the system controller.

An identification method for acquiring fan identification information by communication between a fan motor and a system controller is known. For example, the mode is switched from the normal mode to the command mode, and the fan motor and the system controller transmit and receive commands via a power line, a pulse width modulation (PWM) line, and a tachometer (TACH) line. The system controller acquires fan identification information by handshaking and determines compatibility with the fan motor. In this case, both the system controller and the fan require complicated control software such as software for switching between the normal mode and the command mode.

The above-described conventional technology has required a technique for more easily identifying information about a brushless DC motor (for example, the type of the brushless DC motor).

SUMMARY

An identification method according to an example embodiment of the present disclosure is an identification method used for an identification device that identifies information about a brushless DC motor which is output from the brushless DC motor. The identification method includes supplying a power supply voltage from the identification device to the brushless DC motor via a power line, rotating the brushless DC motor in accordance with a Pulse Width Modulation (PWM) signal output from a drive circuit of the brushless DC motor upon reception of supply of the power supply voltage, and superimposing an identification signal with a same frequency as a frequency of the PWM signal on a power supply current flowing through the power line upon rotation of the brushless DC motor, acquiring the power supply current flowing through the power line and detecting the frequency of the identification signal superimposed on the power supply current, and identifying information about the brushless DC motor based on the detected frequency of the identification signal.

An identification device according to an example embodiment of the present disclosure is an identification device that identifies information about a brushless DC motor including a drive circuit that generates a Pulse Width Modulation (PWM) signal and drives the motor. The identification device includes a power supply terminal to supply a power supply voltage to the brushless DC motor via a power line and a controller to identify information about the brushless DC motor. The controller acquires a power supply current flowing through the power line via the power supply terminal when the brushless DC motor rotates in accordance with the PWM signal output from the drive circuit upon reception of supply of the power supply voltage from the power supply terminal via the power line, with an identification signal with a same frequency as a frequency of the PWM signal being superimposed on the power supply current, detects the frequency of the identification signal superimposed on the power supply current, and identifies information about the brushless DC motor based on the detected frequency of the identification signal.

A brushless DC motor according to an example embodiment of the present disclosure is a brushless DC motor including a circuit board, a power supply terminal disposed on the circuit board to supply a power supply voltage from outside, a coil, and a drive circuit to energize the coil under Pulse Width Modulation (PWM) control. When the drive circuit rotates the brushless DC motor by outputting a PWM signal to perform the PWM control upon reception of supply of the power supply voltage, a power supply current on which an identification signal with a same frequency as a frequency of the PWM signal is superimposed flows through the power supply terminal, and information about the brushless DC motor is superimposed on a signal of the power supply current flowing through the power supply terminal.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 7 is a diagram showing an example of a table used to identify the type of brushless DC motor.

FIG. 9 is a view showing an example table which uses ASCII codes as unique information and is used to identify the type of brushless DC motor.

DETAILED DESCRIPTION

Hereinafter, example embodiments of an identification method and device for identifying the type of a brushless DC motor according to the present disclosure will be described in detail with reference to the accompanying drawings. However, in order to avoid the following description from being unnecessarily redundant and to make it easier for those skilled in the art to understand, a detailed description more than necessary may be omitted. For example, a detailed description of a well-known item or a redundant description of substantially the same configuration may be omitted.

According to the identification method or identification device according to the present disclosure, it is possible to identify various information related to the brushless DC motor output from the brushless DC motor. Such information is, for example, brushless DC motor identification information, brushless DC motor serial number, lot number, input power, input current, input voltage, motor temperature, and rated current or rated voltage. In this specification, example embodiments configured to identify the type of the brushless DC motor among various information related to the brushless DC motor will be mainly described.

Figure 1:
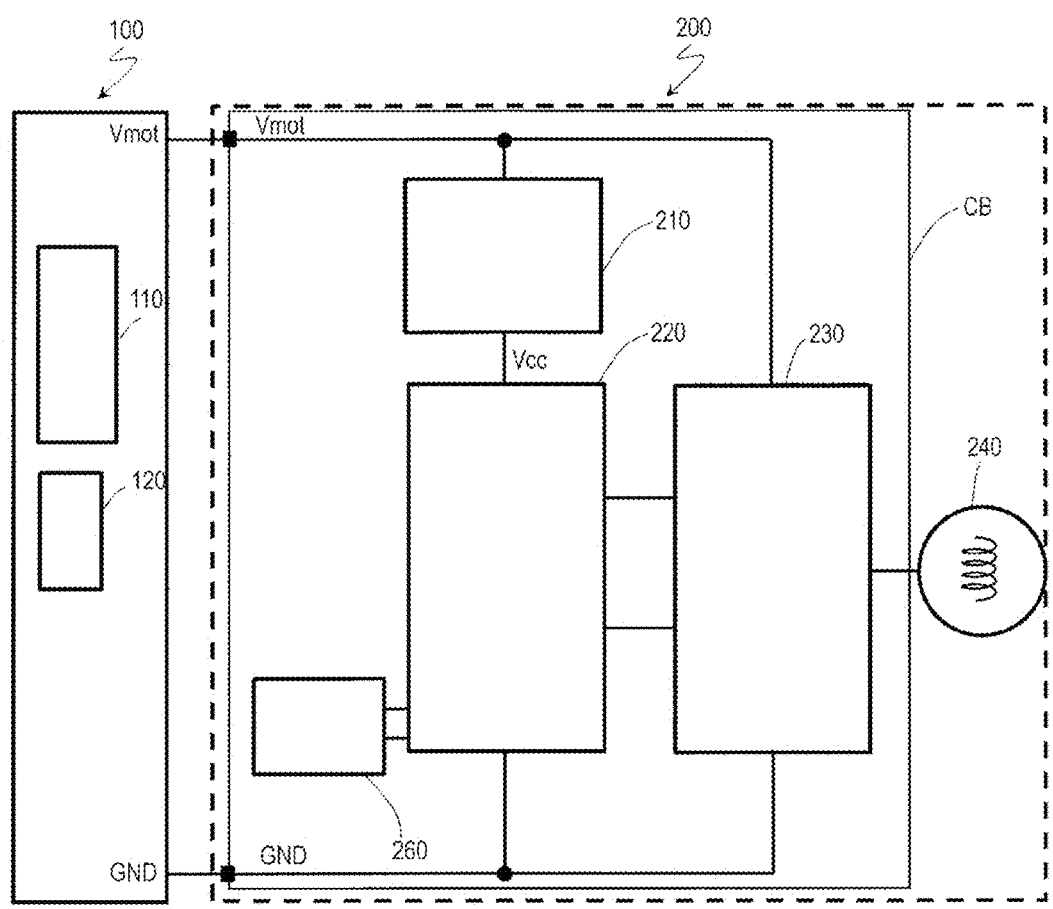
FIG. 1 is a block diagram schematically illustrating a typical block configuration example of a user system 100 and a brushless DC motor 200 according to a first example embodiment of the present invention.

FIG. 1 schematically shows a typical block configuration example of a user system 100 and a brushless DC motor 200. In this specification, the structure and operation of the brushless DC motor 200 will be described using a fan motor as an example. The brushless DC motor according to the present disclosure includes an inner rotor type or outer rotor type motor. The brushless DC motor 200 is not limited to a fan motor, and is a brushless DC motor used for various applications. The brushless DC motor 200 is, for example, a motor used for home appliances such as an air conditioner or a washing machine, and a vehicle-mounted motor.

The user system 100 is electrically connected to the brushless DC motor 200. The user system 100 can supply power to the brushless DC motor 200. The user system 100 can be mounted on a brushless DC motor production management system in a factory that produces a wide variety of products. The user system 100 is a system in an electronic device on which the brushless DC motor 200 can be mounted or a vehicle-mounted system. For example, the brushless DC motor 200 is preferably mounted on an electronic device such as a server, the main body of a desktop personal computer, or a game machine. For example, when brushless DC motors 200 with different specifications are produced at the same location, the user system 100 is part of a series of inspection systems. Alternatively, when the brushless DC motor 200 is mounted as a fan motor on the main body of a server or a desktop personal computer, the user system 100 is the entire system constituted by various electronic components mounted on a motherboard or part of the system.

The user system 100 includes, for example, a controller 110 and a memory 120. The user system 100 according to this example embodiment has a function of identifying the type of the brushless DC motor 200, as described later. In other words, the user system 100 can be used as an identification device for identifying the type of the brushless DC motor 200. Therefore, in this specification, the user system 100 is sometimes referred to as the identification device 100.

The controller 110 mainly controls the entire user system 100 and can control power supply to the brushless DC motor 200. The controller 110 can further identify the type of the brushless DC motor 200. The controller 110 is, for example, a semiconductor integrated circuit such as a micro control unit (MCU) or a field programmable gate array (FPGA).

The memory 120 is, for example, a writable memory (for example, PROM), a rewritable memory (for example, flash memory), or a read-only memory. The memory 120 stores, for example, a control program having a command group for causing the controller 110 to identify the type of the brushless DC motor 200. For example, the control program is temporarily expanded in a RAM (not shown) at the time of booting. The memory 120 need not be externally attached to the controller 110, and may be mounted on the controller 110. The controller 110 including the memory 120 is, for example, the above-described MCU.

The user system 100 includes the Vmot terminal and the GND terminal as connection terminals with the brushless DC motor 200. The Vmot terminal is a terminal for a motor power supply. For example, a motor power supply voltage Vmot of 52 V is supplied to the brushless DC motor 200 from the Vmot terminal.

Figure 2:
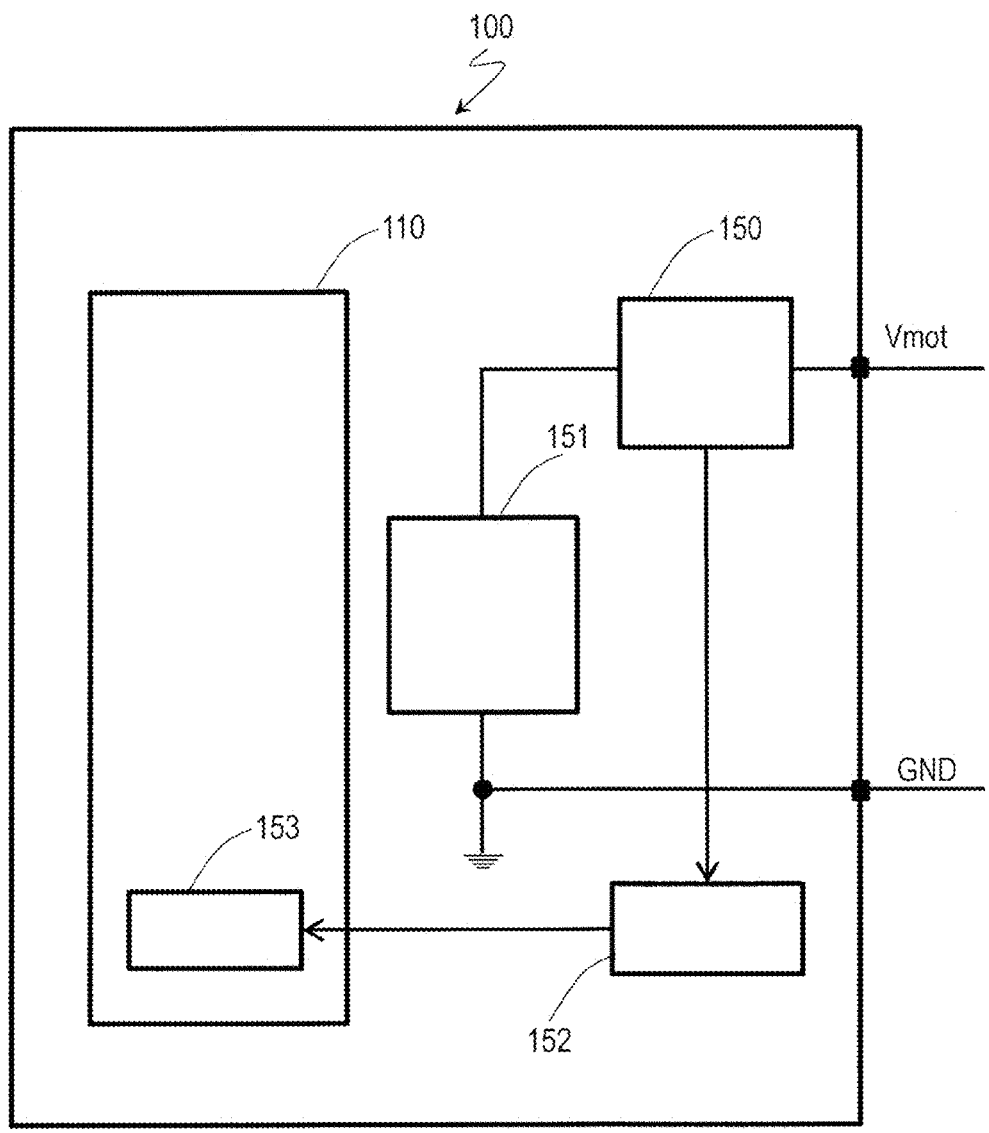
FIG. 2 is a block diagram schematically showing a more detailed block configuration example inside the user system 100.

FIG. 2 schematically shows a more detailed block configuration example inside the user system 100.

The user system 100 further includes, for example, a current detector 150, a DC power supply 151, a frequency identifier 152, and a discriminator 153. In referring to the block configuration inside the user system 100 or the identification device 100, the constituent elements of the controller 110, the current detector 150, the DC power supply 151, the frequency identifier 152, and the discriminator 153 are collectively referred to as simply "controller 110".

The current detector 150 detects a power supply current flowing through the power line of the Vmot terminal as the brushless DC motor 200 rotates. The current detector 150 converts a current waveform flowing through the power line into a voltage waveform.

The DC power supply 151 generates the motor power supply voltage Vmot (for example, 52 V) to be supplied to the brushless DC motor 200.

The frequency identifier 152 can extract frequency information of a signal included in the power supply current detected by the current detector 150 and acquire unique information of the brushless DC motor 200. As the frequency identifier 152, for example, a frequency voltage (FV) converter can be used.

The discriminator 153 identifies the type of the brushless DC motor 200 based on the unique information of the brushless DC motor extracted by the frequency identifier 152. The discriminator 153 is typically mounted on the controller 110.

FIG. 1 is referred to again.

The brushless DC motor 200 is, for example, a DC fan having an impeller. The brushless DC motor 200 is, for example, an axial fan, a centrifugal fan, a crossflow fan, or a sirocco fan. The brushless DC motor 200 typically includes a regulator 210, a motor drive IC 220, an inverter 230, a circuit board CB on which those electronic components are mounted, a coil 240, and a Hall element 260. For example, the regulator 210, the motor drive IC 220, the inverter 230, and the Hall element 260 constitute a drive circuit for energizing the coil 240 to drive the motor.

The regulator 210 lowers a motor power supply voltage Vmot of, for example, 52 V to generate a power supply voltage Vcc (for example, 5 V) for the motor drive IC 220. In the brushless DC motor 200, the power supply voltage Vcc supplied to the motor drive IC 220 is preferably generated based on the motor power supply voltage Vmot. As a result, it is not necessary to provide a terminal for the power supply voltage Vcc in the brushless DC motor 200, and the number of terminals and lead wires can be reduced. However, the power supply voltage Vcc may be supplied from the user system 100 to the brushless DC motor 200 separately from the motor power supply voltage Vmot.

The motor drive IC 220 includes, for example, an MCU (not shown) and is connected to the inverter 230. The MCU generates a PWM signal for controlling the rotation of the motor. The motor drive IC 220 generates a control signal for controlling inverter 230 in accordance with a PWM signal and outputs the control signal to inverter 230.

It is preferable that the motor drive IC 220 outputs a PWM signal after the lapse of a predetermined time from the start of supply of a power supply voltage from the user system 100 to the brushless DC motor 200. By waiting for the power supply voltage Vcc to stabilize, the motor drive IC 220 can be operated more normally.

In one example embodiment, the frequency of the PWM signal generated by the motor drive IC 220 (to be referred to as the "PWM frequency" hereinafter) differs for each type of a plurality of brushless DC motors. It is possible to assign a PWM frequency for each type of a plurality of brushless DC motors. In other words, the brushless DC motor is driven at a different PWM frequency for each type of motor. The PWM frequency represents a natural frequency for brushless DC motor identification.

For example, a PWM frequency can be assigned as a natural frequency for each supplier that manufactures brushless DC motors. For example, a PWM frequency of 20 kHz±2 kHz can be assigned to supplier A, a PWM frequency of 25 kHz±2 kHz can be assigned to supplier B, and a PWM frequency of 30 kHz±2 kHz can be assigned to supplier C. In addition, different PWM frequencies can be assigned to a plurality of suppliers, respectively.

For example, a PWM frequency can be assigned as a natural frequency for each product lot. For example, a PWM frequency of 20 kHz±2 kHz can be assigned to product lot number A, a PWM frequency of 25 kHz±2 kHz can be assigned to product lot number B, and a PWM frequency of 30 kHz±2 kHz can be assigned to product lot number C. Further, a different PWM frequency can be assigned to each of a plurality of product lot numbers. Thus, the types of the plurality of brushless DC motors are, for example, as many as the number of suppliers or as many as the number of product lots to be managed.

The motor drive IC 220 monitors the rotational speed of the motor based on, for example, an output from the Hall element 260, and generates a pulse signal in accordance with the rotational speed of the motor. The output method is, for example, a method of outputting two pulses per rotation. However, a technique that does not use a Hall element is known. In employing such a technique, the Hall element 260 is not essential.

The inverter 230 is electrically connected to the motor drive IC 220 and the coil 240 of the motor. The inverter 230 converts the power of the motor power supply to the power supplied to the fan motor under the control of the motor drive IC 220, and energizes the coil 240 of the motor.

The coil 240 is the winding of the motor.

The brushless DC motor 200 includes, for example, the circuit board CB on which the Vmot terminal and the GND terminal are arranged in correspondence with terminals on the user system 100 side.

Figure 3:
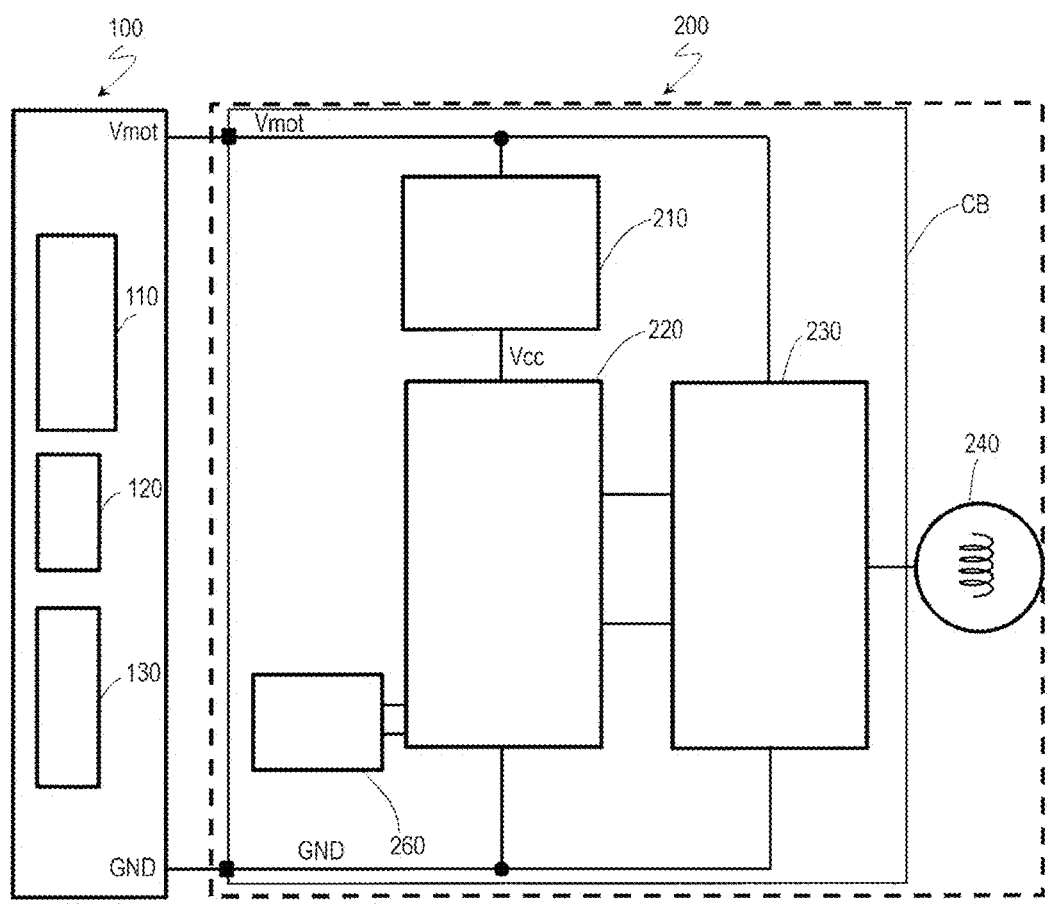
FIG. 3 is a block diagram schematically illustrating another block configuration example of the user system 100 and the brushless DC motor 200.

FIG. 3 schematically shows another block configuration example of the user system 100 and the brushless DC motor 200.

The user system 100 may further include a light-emitting element 130. The light-emitting element 130 has, for example, a plurality of light-emitting diodes (LEDs). The plurality of LEDs are notification devices that notify the identification result of the type of the brushless DC motor 200. For example, a plurality of LEDs can be provided by the number of types of a plurality of brushless DC motors. For example, if there are two types of brushless DC motors of suppliers A and B, two LEDs with different emission colors can be provided. For example, a red LED for supplier A and a blue LED for supplier B can be used.

Figure 4:
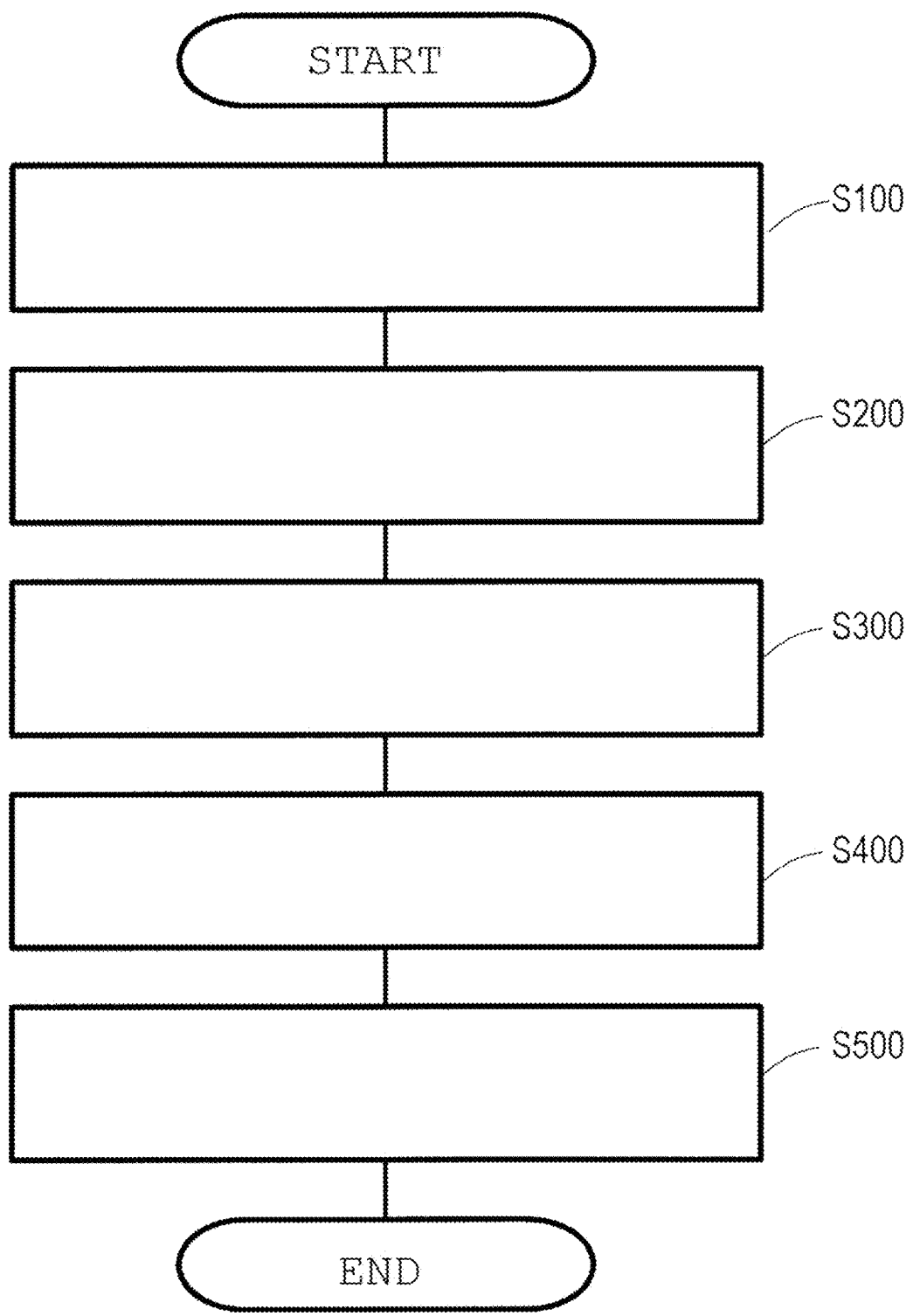
FIG. 4 is a flowchart of an identification method for identifying the type of brushless DC motor according to the first example embodiment.

FIG. 4 is a flowchart showing an identification method for identifying the type of the brushless DC motor 200.

The identification method according to this example embodiment is a method used for, for example, the identification device 100. In the process of manufacturing a variety of products equipped with motors, it is generally necessary to identify the type of the brushless DC motor 200 in order to prevent mixing of different types of motors. For example, the identification method according to the present disclosure is suitably used for a method for inspecting the compatibility of the brushless DC motor 200 with the user system 100 when manufacturing a product in a factory. For example, the step of checking the compatibility of the brushless DC motor 200 can be incorporated as part of the process of manufacturing a product.

First, the motor power supply voltage Vmot is supplied from the identification device 100 (user system 100) to the brushless DC motor 200 with the terminals of the identification device 100 and the brushless DC motor 200 electrically connected.

For example, each electronic component in the brushless DC motor 200 performs an initialization operation such as a reset operation when the power is turned on. The initialization operation is completed, and the stable power supply voltage Vcc is supplied to the regulator 210, the motor drive IC 220, and the inverter 230. Upon receiving the supply of the stable power supply voltage Vcc, the motor drive IC 220 starts generating a PWM signal. Motor drive IC 220 rotates brushless DC motor 200 in accordance with the PWM signal.

The brushless DC motor 200 is rotated in accordance with the PWM signal output from the motor drive IC 220 in response to the supply of the power supply voltage Vcc. A signal having the same frequency as the PWM signal is superimposed on a signal of a power supply current flowing through the power line of Vmot with the rotation of the brushless DC motor 200.

The brushless DC motor 200 rotates under the PWM control of the motor drive IC 220. The PWM signal is output, and the brushless DC motor 200 rotates. At that time, a signal having the same frequency as the PWM signal is superimposed on the power supply current flowing through the power line of Vmot under the influence of the PWM frequency. In this specification, a signal having the same frequency as the PWM signal is referred to as an "identification signal". With the rotation of the brushless DC motor 200, the same frequency as the PWM signal appears in the power supply current waveform. The frequency of the identification signal is associated with the unique information of the brushless DC motor.

Figure 5A:
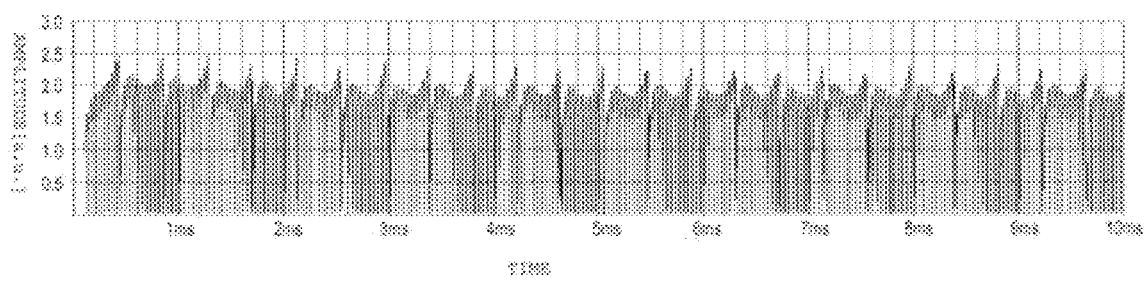
FIG. 5A is a graph illustrating the waveform of a power supply current on which a 20-kHz identification signal is superimposed.
Figure 5B:
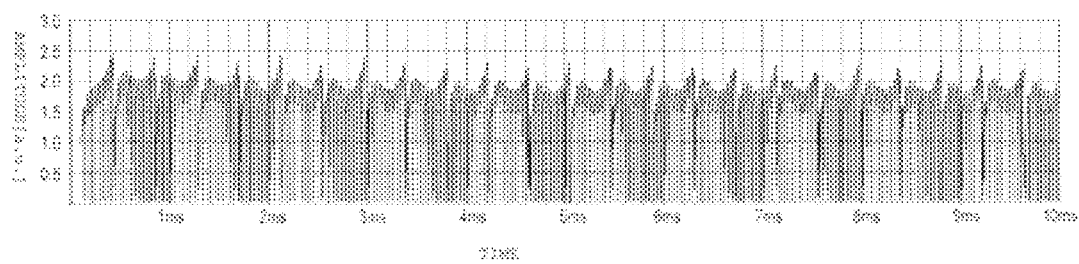
FIG. 5B is a graph illustrating the waveform of a power supply current on which a 25-kHz identification signal is superimposed.
Figure 5C:
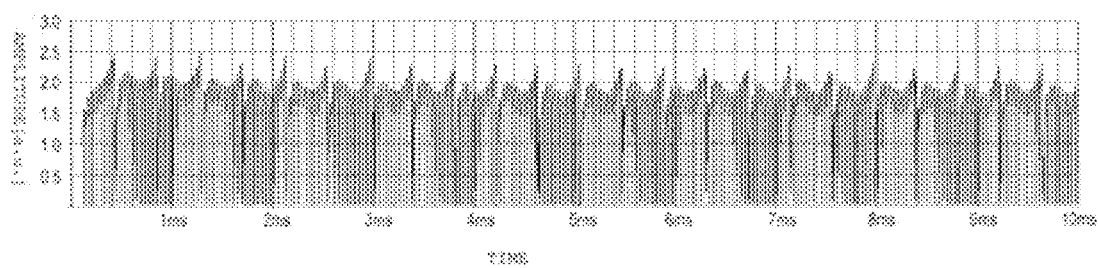
FIG. 5C is a graph illustrating the waveform of a power supply current on which a 30-kHz identification signal is superimposed.

FIG. 5A exemplarily shows the waveform of a power supply current on which a 20-kHz identification signal is superimposed. FIG. 5B exemplarily shows the waveform of a power supply current on which a 25-kHz identification signal is superimposed. FIG. 5C exemplarily shows the waveform of a power supply current on which a 30-kHz identification signal is superimposed. Referring to each graph, the ordinate indicates time, and the ordinate indicates signal amplitude [a.u.].

The current waveform exemplarily shown in FIG. 5A is observed, for example, when the brushless DC motor of supplier A assigned with a PWM frequency of 20 kHz is rotated. The current waveform exemplarily shown in FIG. 5B is observed, for example, when the brushless DC motor of supplier B assigned with a PWM frequency of 25 kHz is rotated. The current waveform exemplarily shown in FIG. 5C is observed, for example, when the brushless DC motor of supplier C assigned with a PWM frequency of 30 kHz is rotated. As described above, the unique information of the brushless DC motor assigned to each type of the plurality of brushless DC motors is superimposed on the power supply current.

Referring again to the flowchart of the identification method shown in FIG. 4.

When the brushless DC motor 200 rotates, a power supply current on which the identification signal is superimposed flows through the power line of Vmot. The identification device 100 acquires the power supply current. The acquired power supply current is detected by the current detector 150 of the identification device 100. When the power supply current is detected by the current detector 150, the current is input to the frequency identifier 152.

The current detector 150 has a resistance element of, for example, about 0.1Ω. The current detector 150 may convert the waveform of the current flowing through the power line into a voltage waveform based on the line current flowing through the resistance element, and amplify the signal of the voltage waveform by an amplifier. An amplifier for amplifying the signal of the voltage waveform may be mounted on the frequency identifier 152 at the subsequent stage.

The frequency identifier 152 detects the frequency of the identification signal superimposed on the power supply current. The frequency identifier 152 is implemented using, for example, an FV converter. The frequency identifier 152 outputs a voltage level corresponding to the frequency component of the identification signal included in the power supply current. The frequency identifier 152 converts a PWM frequency into a voltage level corresponding to the magnitude. This allows the frequency identifier 152 to detect the frequency of the identification signal. The frequency identifier 152 is sometimes referred to as an FV converter 700 hereinafter. The FV converter may be mounted on the current detector 150 in the preceding stage.

Figure 6:
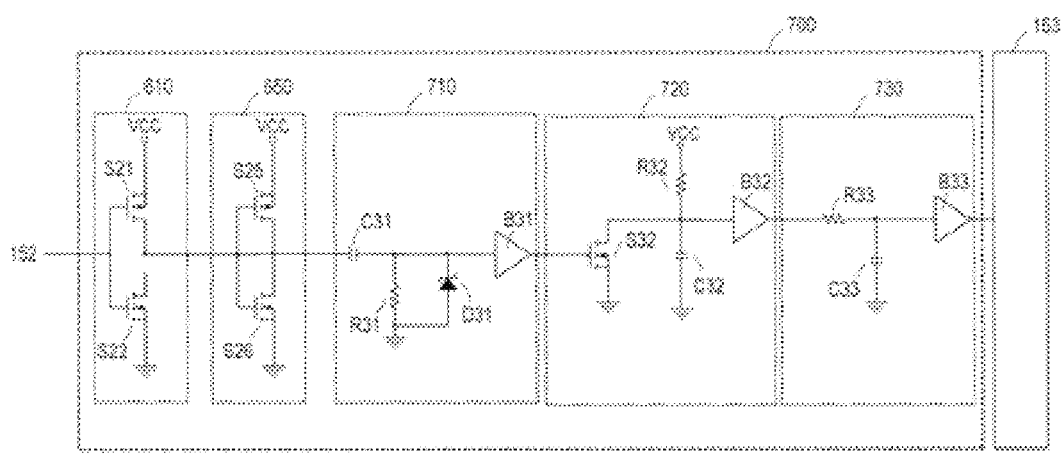
FIG. 6 is a circuit diagram showing an example embodiment of the circuit configuration of an Frequency to Voltage (FV) converter 700 according to a preferred embodiment of the present invention.

FIG. 6 exemplarily shows the circuit configuration of the FV converter 700. In the example shown in FIG. 6, the FV converter 700 includes buffers 610 and 650, a high-pass filter 710, an integrator 720, and a smoothing circuit 730.

The buffer 610 includes switch elements S21 and S22. The buffer 650 includes switch elements S25 and S26. The buffers 610 and 650 have a complementary metal oxide semiconductor (CMOS) structure in which the source of the P-channel MOSFET and the drain of the N-channel MOSFET are connected, and their gates are connected.

The high-pass filter 710 includes a capacitor C31, a resistance element R31 and a diode D31 connected in parallel, and a buffer B31.

The integrator 720 includes a switch element S32, a resistance element R32 and a capacitor C32 connected in series, and a buffer B32. The smoothing circuit 730 includes a resistance element R33, a capacitor C33, and a buffer B33. The resistance values of the resistance elements R31 to R33 are, for example, 10 kΩ, but are not limited to this value. The capacitance of the capacitor C31 is, for example, 0.01 nF or 0.03 nF, but is not limited to this value. The capacitance of the capacitor C32 is, for example, 0.1 nF, but is not limited to this value. The capacitance of the capacitor C33 is, for example, 0.5 nF or 1 nF, but is not limited to this value.

The high-pass filter 710 separates a high-frequency signal from a signal of the current power supply by passing a high frequency component out of frequency components included in the current power supply. The separated high-frequency signal is integrated by the integrator 720. The output signal of the integrator 720 is smoothed by the smoothing circuit 730 and input to the discriminator 153 of the controller 110 as a voltage signal.

The FV converter 700 acquires the unique information of the brushless DC motor based on the detected frequency of the identification signal. For example, when receiving, as an input signal, a power supply current on which a 20-kHz identification signal is superimposed, the FV converter 700 outputs a voltage of V. The voltage level indicates the unique information of supplier A. For example, when receiving, as an input signal, a power supply current on which a 25-kHz identification signal is superimposed, the FV converter 700 outputs a voltage of 25 V. The voltage level indicates the unique information of supplier B. For example, when receiving, as an input signal, a power supply current on which a 30-kHz identification signal is superimposed, the FV converter 700 outputs a voltage of 30 V. The voltage level indicates the unique information of supplier C. The FV converter 700 outputs a signal of a voltage level corresponding to the PWM frequency included in the power supply current to the discriminator 153 of controller 110.

The discriminator 153 identifies the type of motor based on the frequency of the identification signal detected by the frequency identifier 152. The discriminator 153 refers to the table and identifies the type of brushless DC motor from the acquired unique information of the brushless DC motor.

FIG. 7 exemplarily shows a table used to identify the type of brushless DC motor. The table is a look-up table (LUT) that associates a plurality of types of brushless DC motors with the unique information of the plurality of brushless DC motors. The unique information of the brushless DC motor indicates the frequency of an identification signal, that is, a PWM frequency. The table is stored in, for example, the memory 120. As described above, a plurality of types of brushless DC motors exist, for example, for each supplier, and for example, there are three types of suppliers A, B, and C. For example, the type of motor can be represented by, for example, a 3-bit digital signal.

The unique information of the brushless DC motor can be represented by a voltage signal level (for example, 20 V, 25 V, or 30 V) output from the FV converter 700. Alternatively, for example, the discriminator 153 may include an AD converter. The discriminator 153 converts the voltage signal output from the frequency identifier 152 into a digital signal. The unique information of the brushless DC motor can also be represented by a digital value having the same bit width as the resolution of AD conversion. Alternatively, the frequency of an identification signal may be detected by using a voltage level identifier having a plurality of comparators instead of the AD converter. The AD converter or the voltage level identifier may be mounted on the frequency identifier 152 on the preceding stage.

The discriminator 153 acquires the unique information of a brushless DC motor by sampling the output level of the voltage output from the FV converter 700 at time intervals determined based on a predetermined bit rate. A predetermined time interval is, for example, 1 ms. For example, this sampling rate is equal to the sampling rate of the AD converter. This makes it possible to accurately acquire the unique information of a brushless DC motor required for motor identification. For example, when sampling the voltage level of 20 V, the discriminator 153 can specify that the motor to be identified is the brushless DC motor of supplier A by referring to the table.

The discriminator 153 may detect the voltage level in the latter half of the predetermined bit rate time interval. Immediately after the voltage level has changed, the voltage level may not has changed sufficiently. Accordingly, detecting the voltage level at the latter half timing when the voltage level is stabilized makes it possible to accurately detect the voltage level. As a result, more information can be added to the power supply current in a short time and transmitted to the identification device 100.

The present invention is not limited to the above example, and specific information other than the unique information of a motor can be assigned to a PWM frequency. In one example embodiment, a PWM frequency can be assigned to communication state L indicating low-level digital information communication state H indicating high-level digital information "1", or a non-communication state. For example, a PWM frequency of 20 kHz±2 kHz can be assigned to communication state L, a PWM frequency of 25 kHz±2 kHz can be assigned to communication state H, and a PWM frequency of 30 kHz±2 kHz can be assigned to the non-communication state.

The motor drive IC 220 can change the PWM frequency at time intervals determined based on a predetermined bit rate. A predetermined time interval is, for example, 1 ms.

Figure 8:
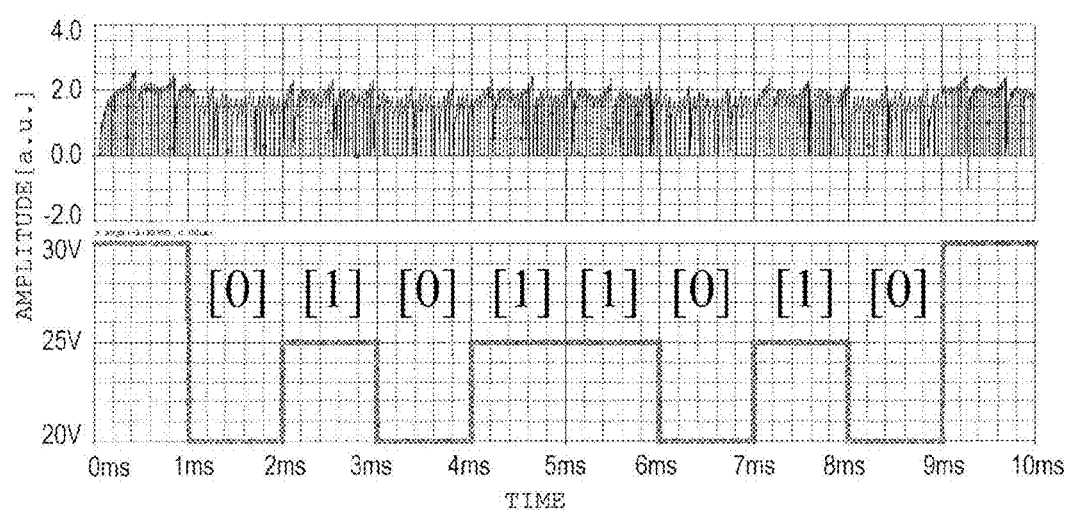
FIG. 8 is a graph showing an example of the waveform (upper side) of a power supply current on which an identification signal including character string information of ASCII code "01011010" of capital letter "Z" is superimposed and the waveform (lower side) of the output level of a frequency identifier 152.

FIG. 8 exemplarily shows the waveform (upper side) of a power supply current on which an identification signal including character string information of ASCII code "01011010" of capital letter "Z" is superimposed and the waveform (lower side) of the output level of a frequency identifier 152. The abscissa of each graph represents time, the ordinate of the upper graph represents signal amplitude [a.u.], and the ordinate of the lower graph represents voltage level.

For example, the motor drive IC 220 on the transmission side changes the PWM frequency every 1 ms in accordance with a communication protocol using, as a trigger to start communication, a change in the output level of the voltage from a no-communication state to communication state H or L. The motor drive IC 220 outputs PWM signals by changing the PWM frequency every 1 ms in the order of 30 kHz, 20 kHz, 25 kHz, 20 kHz, 25 kHz, 25 kHz, 20 kHz, 25 kHz, and 20 kHz. Power supply currents on which identification signals having these frequencies are superimposed flow. FIG. 8 shows the current waveform. Time 1 ms at which the communication state changes from the non-communication state to communication state L indicates a communication start time. According to such a communication protocol, synchronous communication is also possible.

The frequency identifier 152 on the reception side receives an identification signal group including frequency information of 30 kHz, 20 kHz, 25 kHz, 20 kHz, 25 kHz, 25 kHz, 20 kHz, 25 kHz, and 20 kHz, and converts the signals into voltage levels of 30 V, 20 V, 25 V, 20 V, 25 V, 25 V, 20V, 25V, and 20V, respectively. The frequency identifier 152 converts an analog value of "30V, 20V, 25V, 20V, 25V, 25V, 20V, 25V, 20V" into a character string of a digital value of "01011010" using an AD converter. In this way, superimposing an identification signal on the power supply current makes it possible to transmit the ASCII code of a capital letter "Z" from the brushless DC motor 200 to the identification device 100.

For example, it is possible to assign the ASCII code "01000001" of capital letter "A" to supplier A, the ASCII code "01000010" of capital letter "B" to supplier B, and the ASCII code "01000011" of capital letter "C" to supplier C.

FIG. 9 exemplarily shows a table which uses ASCII codes as unique information and is used to identify the type of brushless DC motor. This table associates a plurality of types of brushless DC motors with a plurality of ASCII codes. In this example, the ASCII code is the unique information of each brushless DC motor.

For example, after power is supplied to the brushless DC motor of supplier A, a power supply current on which the ASCII code "01000001" is superimposed flows through the power line. The identification device 100 acquires the power supply current including the ASCII code "01000001" information. The identification device 100 can extract ASCII code information from the signal of the power supply current, and can specify that the motor to be identified is the brushless DC motor of supplier A. Obviously, it is possible to use various code words, other than ASCII codes, such as binary codes.

In addition to the type information of brushless DC motors, various information about brushless DC motors, such as serial numbers, lot numbers, input powers, input currents, input voltages, motor temperatures, rated currents or rated voltages of the respective brushless DC motors can be associated with identification signals. Superimposing an identification signal associated with such information about a signal of the power supply current allows the identification device 100 to acquire various information about the brushless DC motor.

Figure 10:
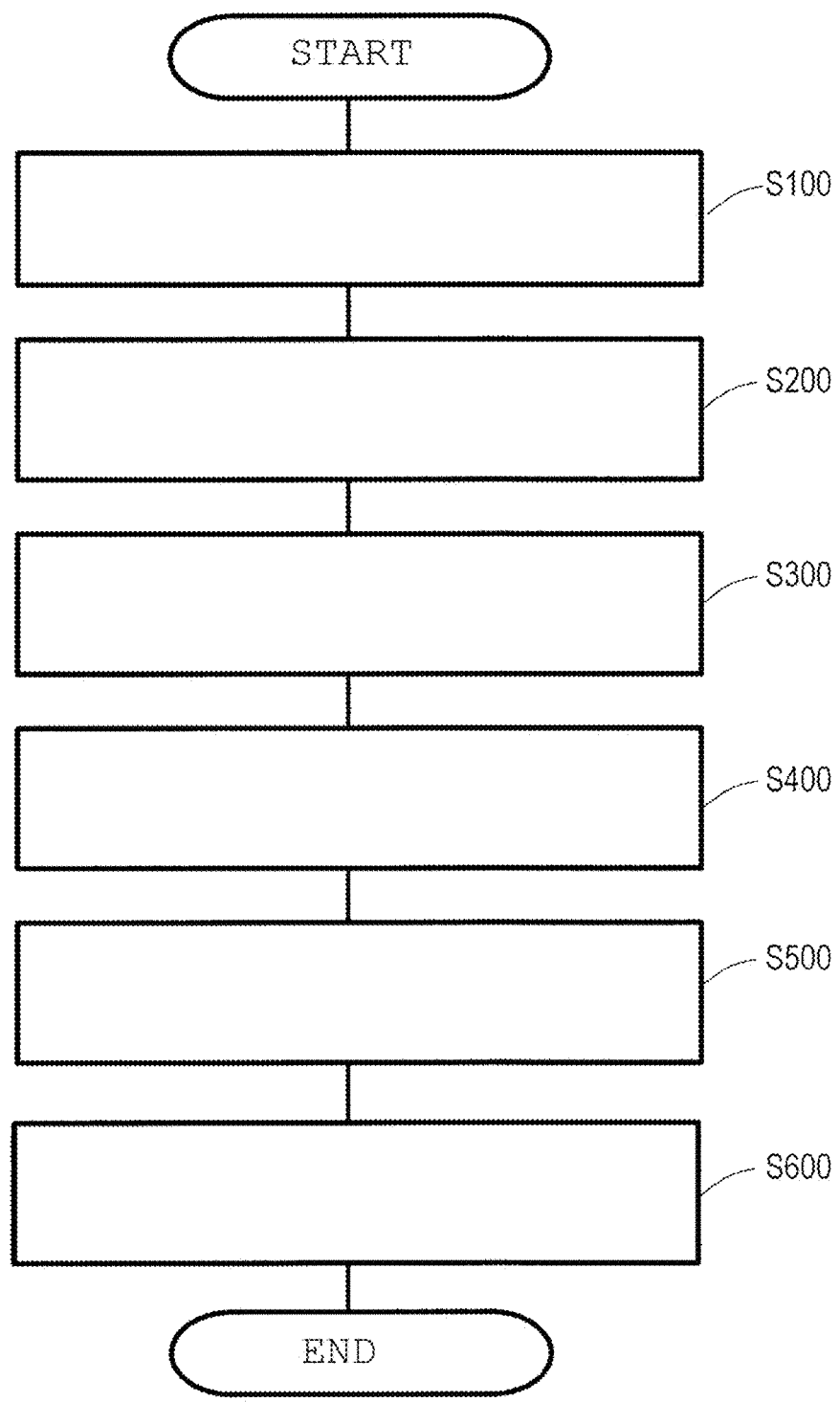
FIG. 10 is a flowchart showing another specific example embodiment of an identification method for identifying the type of the brushless DC motor 200.

FIG. 10 shows another specific example of a flowchart for an identification method for identifying the type of the brushless DC motor 200.

As shown in FIG. 10, the identification method according to this example embodiment can further include step S600 of notifying the result of identifying the type of the brushless DC motor 200.

As an example of a notification method, it is possible to report the result of identifying the type of the brushless DC motor 200 using the light-emitting element 130 (for example, a plurality of LEDs) shown in FIG. 3. The controller 110 of the identification device 100 causes the LED assigned to the brushless DC motor 200 to be identified, among the plurality of LEDs assigned to the respective types of brushless DC motors, to emit light based on the result of identifying the type of the brushless DC motor 200. Note that the light-emitting element is not limited to an LED, and may be an element that notifies by light.

For example, a red LED can be assigned to supplier A, a blue LED can be assigned to supplier B, and a green LED can be assigned to supplier C. Upon identifying the brushless DC motor of supplier C, the controller 110 of the identification device 100 can cause the green LED to emit light. Thus, for example, a factory worker can visually recognize whether or not the brushless DC motor to be identified is a motor of supplier C.

As another example, it is possible to notify the result of identifying the type of the brushless DC motor 200 by using a display device (for example, a liquid crystal display) or a loudspeaker. For example, the identification result can be displayed on a liquid crystal display as character information. For example, it is possible to change the pitch of the sound for each type of a plurality of brushless DC motors and make the loudspeaker generate sound.

As another example, the controller 110 of the identification device 100 may temporarily write the identification result in the memory 120 or transmit it to another apparatus or device that needs the identification result. These forms are also examples of notifying the identification result.

According to this example embodiment, when the power is supplied to the brushless DC motor 200, the power supply current on which an identification signal including the unique information of the brushless DC motor is superimposed flows through the power line. The identification device 100 can acquire a power supply current and analyze a frequency component included in the power supply current. Conventionally, communication by handshaking between the identification device 100 and the brushless DC motor 200 is unnecessary. In addition, an existing power supply terminal can be used, and it is not necessary to newly provide a dedicated terminal for identification. The product cost can be reduced by reducing the number of parts.

The identification method according to the present disclosure is preferably used not only at the time of product manufacture but also, for example, when replacing a failed brushless DC motor with a new brushless DC motor. You can check whether the replaced brushless DC motor is compatible with the system. Also, for example, each product equipped with a brushless DC motor is connected to the Internet. The so-called internet of things (IoT) is implemented. For example, the supplier of an individual product equipped with a brushless DC motor can identify a product equipped with a specific brushless DC motor by analyzing big data including the unique information of the brushless DC motor. This can stabilize the quality, for example, by preventing the occurrence of defects.

Figure 11:
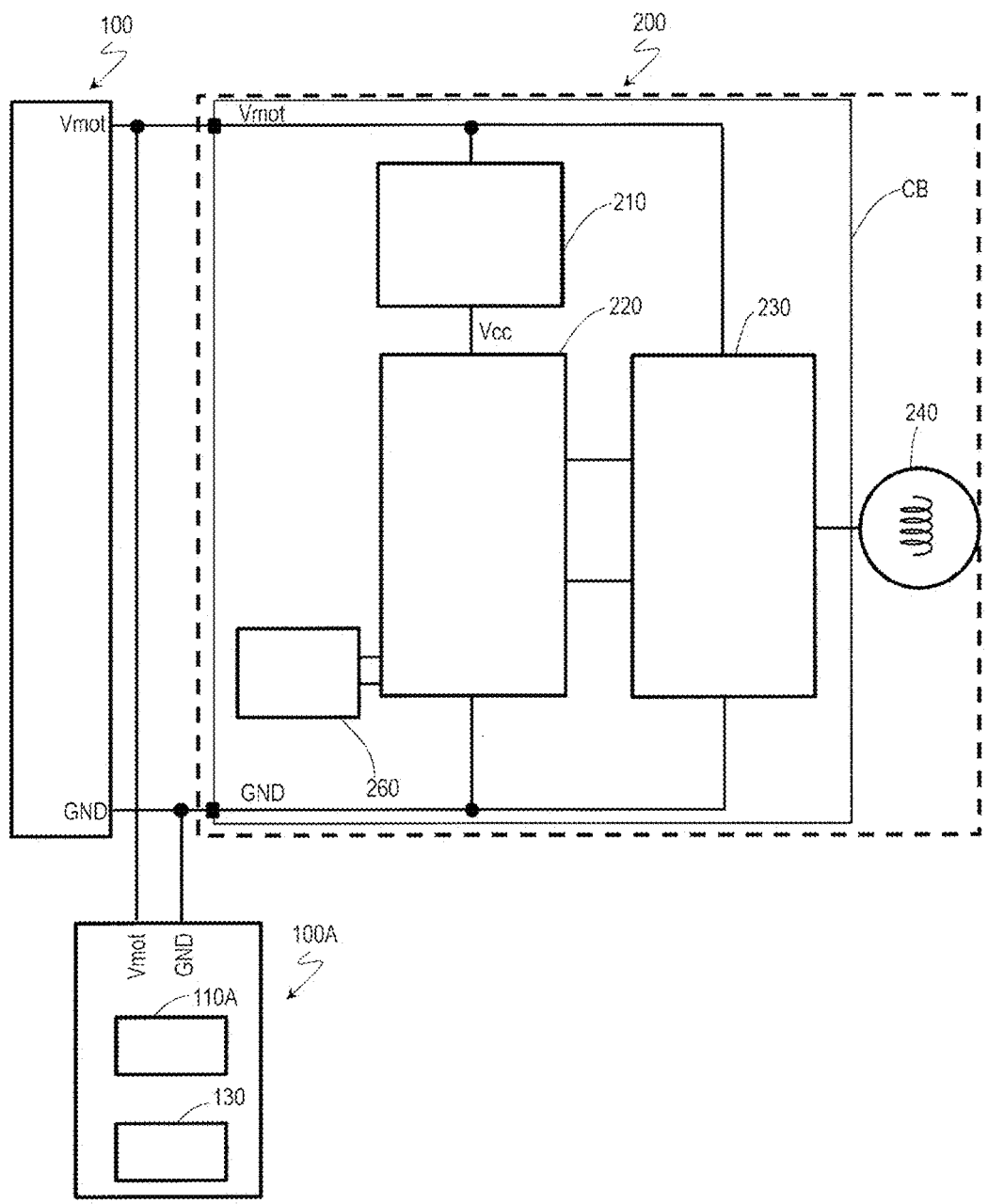
FIG. 11 is a block diagram schematically illustrating the typical block configuration example of a user system 100, an identification device 100A, and a brushless DC motor 200 according to a second example embodiment.

FIG. 11 schematically shows a typical block configuration example of a user system 100, an identification device 100A, and a brushless DC motor 200.

Unlike the first example embodiment, the identification device 100A according to this example embodiment is a device separate from the user system 100. The identification device 100A includes, for example, an MCU 110A equipped with a current detector 150, a DC power supply 151, a frequency identifier 152, and a discriminator 153, and an LED 130. It should be noted that the current detector 150, the DC power supply 151, the frequency identifier 152, and the discriminator 153 are not shown in FIG. 11 for the sake of simplicity. The identification device 100A includes a Vmot terminal and a GND terminal as terminals necessary for identifying the type of the brushless DC motor 200.

The user system 100, the identification device 100A, and the brushless DC motor 200 are electrically connected to each other between the Vmot terminal and the GND terminal. A power supply voltage can be supplied from the identification device 100A to the brushless DC motor 200 via the Vmot terminal.

When the power is turned on, a power supply current on which an identification signal including unique information of the brushless DC motor 200 is superimposed flows through the power line. The identification device 100A can identify the type of the brushless DC motor 200, for example, according to the processing flow shown in FIG. 4. The MCU 110A may transmit the identification result to the controller 110 of the user system 100.

Figure 12:
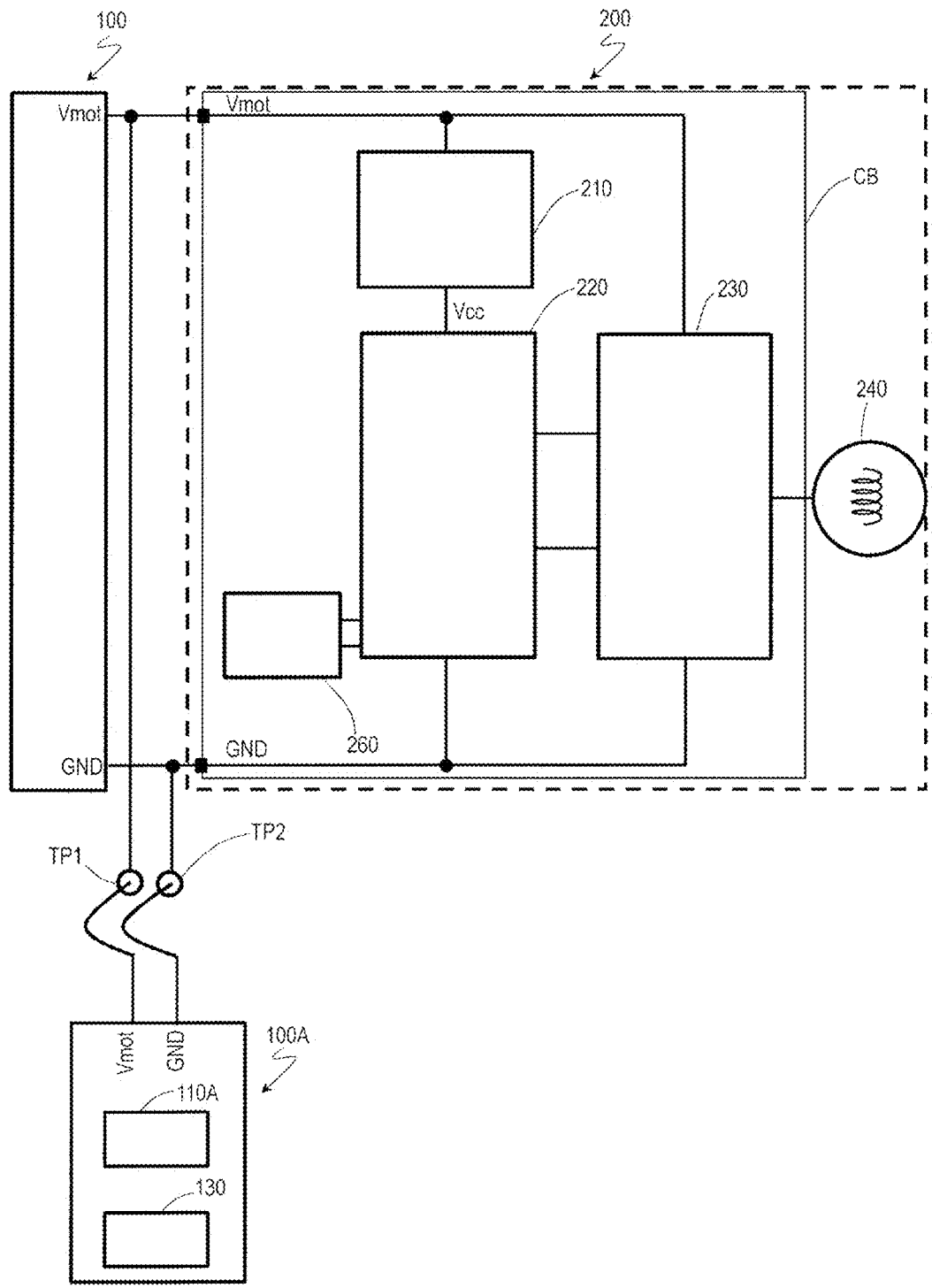
FIG. 12 is a block diagram schematically illustrating another block configuration example embodiment of the user system 100, the identification device 100A, and the brushless DC motor 200 according to the second example embodiment.

FIG. 12 schematically shows another example of the block configuration of the user system 100, the identification device 100A, and the brushless DC motor 200.

The identification device 100A is electrically connected to the user system 100 and the brushless DC motor 200 via, for example, a test point (TP). A TP1 is a motor power supply TP. A TP2 is a TP for GND. Connecting a dedicated probe to the identification device 100A and bringing the probe into contact with the TP can identify the type of the brushless DC motor 200.

An outline of one aspect of the present disclosure will be described below.

The identification method according to the example embodiment of the present disclosure is an identification method for identifying information about the brushless DC motor 200 output from the brushless DC motor 200, which is used for, for example, the identification device 100. As described with reference to the processing flowchart of FIG. 4, the identification method includes supplying a motor power supply voltage Vmot from the identification device 100 to the brushless DC motor 200 via the power line, receiving the supply of the motor power supply voltage Vmot to rotate the brushless DC motor 200 in accordance with the PWM signal output from a drive circuit 220 of the DC motor 200, superimposing an identification signal having the same frequency as that of the PWM signal on a power supply current flowing through the power line upon rotation of the brushless DC motor 200, acquiring the power supply current flowing through the power line, detecting the frequency of the identification signal superimposed on the power supply current, and identifying information about the brushless DC motor 200 based on the detected frequency of the identification signal. The information about the brushless DC motor 200 is, for example, brushless DC motor 200 identification information, brushless DC motor 200 serial number, lot number, input power, input current, input voltage, motor temperature, and rated current or rated voltage.

According to this identification method, rotating a brushless DC motor 200 with a PWM signal of a predetermined frequency generates a power supply current on which an identification signal is superimposed. Analyzing a frequency included in the power supply current can identify information about a brushless DC motor 200 without performing handshaking.

In an example embodiment, the information about the brushless DC motor 200 indicates the type of the brushless DC motor 200, and the unique information of the brushless DC motor assigned for each type of brushless DC motor is superimposed on the acquired power supply current. For example, the unique information of the brushless DC motor is exemplified in the table shown in FIG. 7 or 9.

According to such an identification method, the type of brushless DC motor can be identified by analyzing the frequency included in the power supply current.

In an example embodiment, in identifying the type of the brushless DC motor 200, the unique information of the brushless DC motor 200 is acquired based on the detected frequency of the identification signal, and the type of the brushless DC motor 200 is identified from the unique information of the brushless DC motor 200 acquired by referring to the table exemplarily shown in, for example, FIG. 7 or 9, which associates the types of the brushless DC motors with the unique information of the plurality of brushless DC motors.

According to such an identification method, the type of brushless DC motor can be identified by analyzing the frequency included in the power supply current.

In one example embodiment, the frequency of the PWM signal generated by the drive circuit 220 is assigned to each type of a plurality of brushless DC motors.

According to such an identification method, a variation that associates specific information with an identification signal is provided.

In one example embodiment, as described with reference to FIG. 8, the frequency of the PWM signal generated by the drive circuit 220 is assigned to communication state L indicating low-level digital information, communication state H indicating high-level digital information, or the non-communication state, and changed at time intervals determined based on a predetermined bit rate, for example, every 1 ms.

According to this identification method, it is possible to transmit various information about the brushless DC motor 200, such as the identification information of the brushless DC motor 200, the serial number of the brushless DC motors 200, the lot number, the input power, the input current, the input voltage, the motor temperature, the rated current or rated voltage to the identification device 100 and to identify these pieces of information.

In one example embodiment, as described with reference to the processing flowchart of FIG. 4, in obtaining a power supply current, the power supply current on which the unique information of the brushless DC motor 200 is superimposed is acquired, and, in identifying the type of the brushless DC motor 200, the unique information of the brushless DC motor 200 is extracted from a signal of the acquired power supply current, and the type of the brushless DC motor 200 is identified based on the extracted unique information of the brushless DC motor 200.

According to such an identification method, the type of brushless DC motor can be identified by analyzing the frequency included in the power supply current.

In one example embodiment, in identifying the type of the brushless DC motor 200, the detected frequency of the identification signal is converted into a voltage by using the FV converter 700 shown in, for example, FIG. 6, and the output level of the voltage output from the FV converter 700 is sampled at time intervals determined based on a predetermined bit rate, for example, every 1 ms, thereby acquiring the unique information of the brushless DC motor 200.

According to such an identification method, the unique information of the brushless DC motor 200 can be appropriately acquired using the FV converter 700.

In one example embodiment, the output level of the voltage output from the FV converter 700 is sampled in the second half of the time interval determined based on the predetermined bit rate.

According to such an identification method, the voltage level can be accurately detected. As a result, more information can be added to the power supply current in a short time and transmitted to the identification device 100.

In one example embodiment, in identifying the type of the brushless DC motor 200, the detected frequency of the identification signal is converted into a voltage by using the FV converter 700 shown in, for example, FIG. 6, and the output level of the voltage output from the FV converter 700 is sampled at time intervals, for example, every 1 ms, thereby acquiring the unique information of the brushless DC motor 200 which is transmitted from the brushless DC motor 200 in accordance with a communication protocol using, as a trigger to start communication, a change in the output level of the voltage from a non-communication state to a communication state, as described with reference to FIG. 8.

According to this identification method, it is possible to properly acquire various information about the brushless DC motor 200, such as the identification information of the brushless DC motor 200, the serial number of the brushless DC motors 200, the lot number, the input power, the input current, the input voltage, the motor temperature, the rated current or rated voltage by using the FV converter 700.

In one example embodiment, the brushless DC motor 200 generates a drive power Vcc to be supplied to the drive circuit 220 based on the motor power supply voltage Vmot.

According to such an identification method, the numbers of terminals and lead wires can be reduced.

In one example embodiment, the drive circuit 220 outputs a PWM signal after a predetermined time has elapsed since the start of supply of the motor power supply voltage Vmot to the brushless DC motor 200.

According to such an identification method, by waiting for the power supply voltage Vcc to stabilize, the motor drive IC 220 can be operated more normally.

In one example embodiment, the identification method further includes using the identification device 100 to notify the result of identifying the type of the brushless DC motor 200.

According to such an identification method, for example, as described above, the controller 110 of the identification device 100 may temporarily write the identification result in the memory 120 or transmit it to another apparatus or device that needs the identification result. In addition, it is possible to notify the result of identifying the type of the brushless DC motor 200 by using a display device (for example, a liquid crystal display) or a loudspeaker.

In one example embodiment, the method of identifying the brushless DC motor 200 further includes causing the light-emitting element to emit light based on the result of identifying the type of the brushless DC motor, the light-emitting element being assigned to the brushless DC motor 200 to be identified, among the plurality of light-emitting elements 130, for example, the plurality of LEDs, assigned to the respective types of brushless DC motors.

According to such an identification method, for example, a red LED can be assigned to supplier A, a blue LED can be assigned to supplier B, and a green LED can be assigned to supplier C. Upon identifying the brushless DC motor of supplier C, the controller 110 of the identification device 100 can cause the green LED to emit light.

According to one example embodiment, the brushless DC motor 200 is, for example, a DC fan having an impeller.

According to such an identification method, for example, it is possible to identify the type of the brushless DC motor 200 such as an axial fan, a centrifugal fan, a crossflow fan, or a sirocco fan.

The identification device 100 according to an example embodiment of the present disclosure is an identification device that identifies information about the brushless DC motor 200 including the drive circuit 220 that generates a PWM signal and drives the motor. As described with reference to FIG. 2, the identification device 100 includes a power supply terminal for supplying the motor power supply voltage Vmot to the brushless DC motor 200 via a power line and a controller 110 for identifying information about the brushless DC motor 200. The controller 110 acquires, via the power supply terminal, a power supply current flowing through the power line when the brushless DC motor 200 rotates in accordance with the PWM signal output from the drive circuit 220 upon reception of the supply of the motor power supply voltage Vmot from the power supply terminal via the power line. An identification signal having the same frequency as the PWM signal is superimposed on the power supply current. The controller 110 then detects the frequency of the identification signal superimposed on the power supply current and identifies information about the brushless DC motor based on the detected frequency of the identification signal.

According to this identification device, rotating a brushless DC motor 200 with a PWM signal of a predetermined frequency generates a power supply current on which an identification signal is superimposed. Analyzing a frequency included in the power supply current can identify information about a brushless DC motor 200 without performing handshaking.

In one example embodiment, information about a brushless DC motor indicates the type of the brushless DC motor 200. In acquiring a power supply current, the controller 110 acquires a power supply current on which the unique information of the brushless DC motor 200 assigned for each type of the plurality of brushless DC motors is superimposed and which changes at time intervals determined based on a predetermined bit rate, for example, 1 ms. The controller 110 extracts the unique information of the brushless DC motor 200 from a signal of the acquired power supply current in identifying the information about the brushless DC motor, and identifies the type of brushless DC motor based on the extracted unique information of the brushless DC motor 200.

According to such an identification device, the type of brushless DC motor 200 can be identified by analyzing the frequency included in the power supply current.

In one example embodiment, the identification device 100 further includes, for example, the FV converter 700 shown in FIG. 6. In identifying the type of brushless DC motor, the FV converter 700 converts the detected frequency of the identification signal into a voltage. The controller 110 acquires the unique information of the brushless DC motor 200 by sampling the output level of the voltage output from the FV converter 700 at time intervals determined based on a predetermined bit rate, for example, every 1 ms.

According to such an identification device, the unique information of the brushless DC motor 200 can be appropriately acquired using the FV converter 700.

In one example embodiment, the identification device 100 further includes the plurality of light-emitting elements 130 assigned to the respective types of brushless DC motors as shown in, for example, FIG. 3. Each light-emitting element is, for example, an LED. The controller 110 causes the light-emitting element assigned to the brushless DC motor 200 to be identified, among the plurality of light-emitting elements 130, to emit light based on the result of identifying the type of the brushless DC motor.

According to such an identification device, for example, a red LED can be assigned to supplier A, a blue LED can be assigned to supplier B, and a green LED can be assigned to supplier C. Upon identifying the brushless DC motor of supplier C, the controller 110 of the identification device 100 can cause the green LED to emit light.

As described with reference to, for example, FIG. 1, the brushless DC motor 200 according to an example embodiment of the present disclosure includes a circuit board CB, a power supply terminal disposed on the circuit board CB and configured to supply a motor power supply voltage Vmot from outside, a coil 240, and a drive circuit 220 that energizes the coil 240 under PWM control. When the drive circuit 220 rotates the brushless DC motor 200 by outputting a PWM signal for performing PWM control upon reception of the supply of the motor power supply voltage Vmot, the power supply current on which the identification signal having the same frequency as the PWM signal is superimposed flows through the power supply terminal, and information about the brushless DC motor 200 is superimposed on a signal of a power supply current flowing through the power supply terminal.

According to the brushless DC motor 200, superimposing information about the brushless DC motor 200 on a signal of a power supply current flowing through the power supply terminal makes it possible to identify various information about the brushless DC motor 200, such as the identification information of the brushless DC motor 200, the serial number of the brushless DC motors 200, the lot number, the input power, the input current, the input voltage, the motor temperature, the rated current or rated voltage.

The example embodiments of the present disclosure are widely used in various devices including various fan motors, such as personal computers, game machines, vacuum cleaners, dryers, washing machines, and refrigerators.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An identification method used for an identification device that identifies information about a brushless DC motor which is output from the brushless DC motor, the identification method comprising:
supplying a power supply voltage from the identification device to the brushless DC motor via a power line;
rotating the brushless DC motor in accordance with a Pulse Width Modulation (PWM) signal output from a drive circuit of the brushless DC motor upon reception of supply of the power supply voltage, and superimposing an identification signal with a same frequency as a frequency of the PWM signal on a power supply current flowing through the power line upon rotation of the brushless DC motor;

acquiring the power supply current flowing through the power line and detecting the frequency of the identification signal superimposed on the power supply current; and identifying information about the brushless DC motor based on the detected frequency of the identification signal.

2. The identification method according to claim 1, wherein the information about the brushless DC motor indicates a type of the brushless DC motor; and unique information of the brushless DC motor assigned for each type of a plurality of the brushless DC motors is superimposed on the acquired power supply current.

3. The identification method according to claim 2, further comprising:

in identifying the type of the brushless DC motor, acquiring the unique information of the brushless DC motor based on the detected frequency of the identification signal; and identifying the type of the brushless DC motor from the acquired unique information of the brushless DC motor by referring to a table associating the types of the plurality of brushless DC motors with the unique information of the plurality of brushless DC motors.

4. The identification method according to claim 3, further comprising assigning the frequency of the PWM signal generated by the drive circuit to each type of the plurality of brushless DC motors.

5. The identification method according to claim 3, further comprising:

assigning the frequency of the PWM signal generated by the drive circuit to a communication state indicating low-level digital information, a communication state indicating high-level digital information, or a non-communication state; and changing the frequency of the PWM signal at time intervals determined based on a predetermined bit rate.

6. The identification method according to claim 4, further comprising:

in acquiring the power supply current, acquiring the power supply current on which the unique information of the brushless DC motor is superimposed; and in identifying the type of the brushless DC motor, extracting the unique information of the brushless DC motor from a signal of the acquired power supply current, and identifying the type of the brushless DC motor based on the extracted unique information of the brushless DC motor.

7. The identification method according to claim 6, further comprising:

in identifying the type of the brushless DC motor, converting the detected frequency of the identification signal into a voltage by using an FV converter; and acquiring the unique information of the brushless DC motor by sampling an output level of the voltage output from the FV converter at the time intervals determined based on the predetermined bit rate.

8. The identification method according to claim 7, further comprising sampling the output level of the voltage in a latter half of the time intervals.

9. The identification method according to claim 5, further comprising:

in identifying the type of the brushless DC motor, converting the detected frequency of the identification signal into a voltage by using an FV converter;

sampling an output level of the voltage output from the FV converter at the time intervals; and acquiring the unique information of the brushless DC motor which is transmitted from the brushless DC motor in accordance with a communication protocol using, as a trigger to start communication, a change in the output level of the voltage from the non-communication state to the communication state.

10. The identification method according to claim 1, further comprising generating drive power to be supplied to the drive circuit based on the power supply voltage in the brushless DC motor.

11. The identification method according to claim 1, further comprising causing the drive circuit to output the PWM signal after a lapse of a predetermined time from start of supply of the power supply voltage to the brushless DC motor.

12. The identification method according to claim 2, further comprising notifying a result of identifying the type of the brushless DC motor using the identification device.

13. The identification method according to claim 2, further comprising causing a light-emitting element to emit light based on a result of identifying the type of the brushless DC motor, the light-emitting element being assigned to the brushless DC motor to be identified, among a plurality of the light-emitting elements assigned to the respective types of the plurality of brushless DC motors.

14. The identification method according to claim 1, wherein the brushless DC motor is a fan motor including an impeller.

15. An identification device that identifies information about a brushless DC motor including a drive circuit that generates a PWM signal and drives the motor, the identification device comprising:

a power supply terminal to supply a power supply voltage to the brushless DC motor via a power line; and a controller configured or programmed to identify information about the brushless DC motor; wherein the controller is configured or programmed to:

acquire a power supply current flowing through the power line via the power supply terminal when the brushless DC motor rotates in accordance with the PWM signal output from the drive circuit upon reception of supply of the power supply voltage from the power supply terminal via the power line, with an identification signal with a same frequency as a frequency of the PWM signal being superimposed on the power supply current;

detect the frequency of the identification signal superimposed on the power supply current; and identify information about the brushless DC motor based on the detected frequency of the identification signal.

16. The identification device according to claim 15, wherein the information about the brushless DC motor indicates a type of the brushless DC motor; and the controller, in acquiring the power supply current, acquires the power supply current on which the unique information of the brushless DC motor assigned for each type of a plurality of the brushless DC motors is superimposed and which changes at time intervals determined based on a predetermined bit rate, and extracts the unique information of the brushless DC motor from a signal of the acquired power supply current in identifying the information about the brushless DC motor, and identifies the type of the brushless DC motor based on the extracted unique information of the brushless DC motor.

17. The identification device according to claim 16, further comprising a Frequency to Voltage (FV) converter; wherein
in identifying the type of the brushless DC motor, the FV converter converts the detected frequency of the identification signal into a voltage; and
the controller acquires the unique information of the brushless DC motor by sampling an output level of the voltage output from the FV converter at the time intervals determined based on the predetermined bit rate.

18. The identification device according to claim 16, further comprising a plurality of light-emitting elements assigned to the respective types of the plurality of brushless DC motors; wherein
the controller causes a light-emitting element to emit light based on a result of identifying the type of the brushless DC motor, the light-emitting element being assigned to the brushless DC motor to be identified, among the plurality of light-emitting elements.

19. A brushless DC motor comprising:
a circuit board;
a power supply terminal disposed on the circuit board to supply a power supply voltage from outside;
a coil; and
a drive circuit to energize the coil under Pulse Width Modulation (PWM) control; wherein
when the drive circuit rotates the brushless DC motor by outputting a PWM signal to perform the PWM control upon reception of supply of the power supply voltage, a power supply current on which an identification signal with a same frequency as a frequency of the PWM signal is superimposed flows through the power supply terminal; and
information about the brushless DC motor is superimposed on a signal of the power supply current flowing through the power supply terminal.

* * * * *